FIG. I

STUART DUNCAN DAVIES
JOHN ALFRED CHILMAN
INVENTORS

Jan. 13, 1970   J. A. CHILMAN   3,489,338
GAS TURBINE ENGINES

Filed April 12, 1967   4 Sheets-Sheet 2

STUART DUNCAN DAVIES
JOHN ALFRED CHILMAN
INVENTORS

BY Young + Thompson
ATTORNEYS

Jan. 13, 1970     J. A. CHILMAN     3,489,338
GAS TURBINE ENGINES

Filed April 12, 1967     4 Sheets-Sheet 4

STUART DUNCAN DAVIES
JOHN ALFRED CHILMAN
INVENTORS

BY *Young + Thompson*

ATTORNEYS

United States Patent Office 3,489,338
Patented Jan. 13, 1970

3,489,338
GAS TURBINE ENGINES
John Alfred Chilman and Stuart Duncan Davies, Painswick, England, assignors to Dowty Rotol Limited, Gloucester, England
Filed Apr. 12, 1967, Ser. No. 630,250
Claims priority, application Great Britain, Apr. 12, 1966, 16,008/66; May 25, 1966, 23,428/66; Feb. 3, 1967, 5,268/67
Int. Cl. F04d 27/00; F02k 1/02, 3/02
U.S. Cl. 230—114                                    13 Claims

ABSTRACT OF THE DISCLOSURE

A gas turbine engine of the ducted-fan by-pass type includes a fan having flow-varying blading and rotatable in a by-pass duct, the blading being adjustable under the control of a servo mechanism which is preferably disposed within the hub of the fan. In preferred constructions the fan is mounted ahead of the engine compressor and the blading is of variable pitch which is adjustable to a feathered position. It is additionally preferred that the blading should be adjustable to provide zero, or near zero, pitch and also negative pitch with a resultant reverse air flow along the duct.

---

Figure 1:
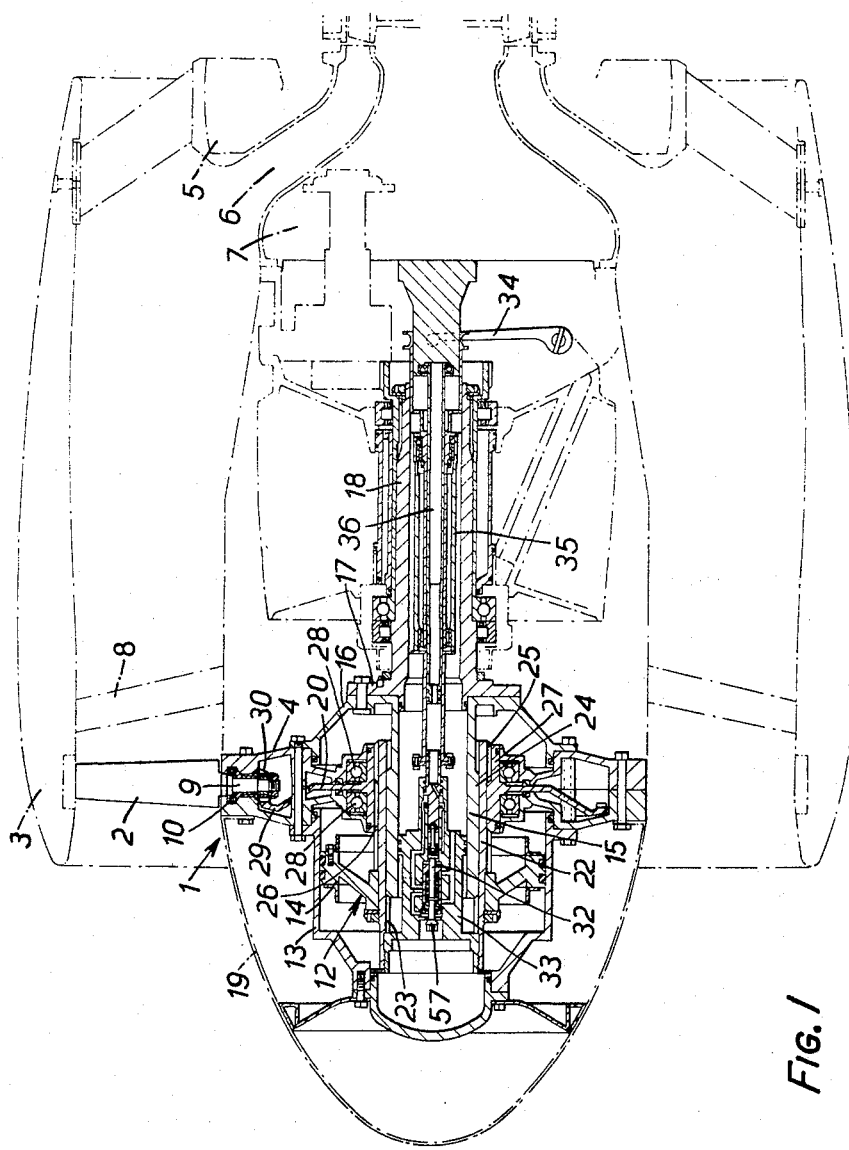

This invention relates to gas turbine engines, more particularly gas turbine engines of the ducted-fan by-pass type, and to propulsion systems for aircraft or other vehicles utilising such engines, hereinafter termed aircraft propulsion systems.

According to one aspect of the invention a gas turbine engine of the by-pass type includes a fan having flow-varying blading and rotatable in a by-pass duct, said blading being effectively adjustable under the control of a servo mechanism. The term "servo mechanism" is used herein as referring to a servo system of the closed-loop type which provides positional control of the blade adjustment which may be achieved by pitch variation, for example, of the fan blading.

It is preferred that the fan should be mounted ahead of the engine compressor so that it is operative to charge both the compressor and the by-pass duct, and it will be understood that the term "ahead" is used herein in the aerodynamic sense, i.e. to indicate that the fan is upstream of the engine having regard to the direction of air flow through the latter.

With increasing by-pass ratios, i.e. the ratio of cold air flow passing through the fan and over the exterior of the engine cowling to that passing through the engine, or in other words with increasing fan size relatively to the gas producer part of the engine, the high windmilling drag which occurs in flight in the event of engine failure becomes ever more serious.

Accordingly, in accordance with a further feature of the invention the fan blading may be adjustable to bring the blades effectively to a feathered position, i.e. to a position approximately 90° from zero pitch. Thereby the drag of the power plant in the event of engine failure may be considerably reduced.

Preferably the fan blading is also effectively reversible for reversing the direction of air flow along the duct, thereby to provide aerodynamic braking. The fan preferably has a large multiplicity of blades, for example 17 or even more, and design considerations may require a solidity ratio greater than unity; in this case turning of the fan blades to reverse pitch is effected through the feathered position, i.e. so that the trailing edges of the blades in forward pitch become the leading edges in the reverse pitch position.

The invention finds particular application to two-spool or multi-spool engines, particularly to engines having a front fan driven by a free turbine. In this case the fan, mounted ahead of the L.P. compressor of the engine, is driven by a free turbine aft of the L.P. turbine stage through the L.P. and H.P. assemblies.

By means of the invention the pitch of the fan blading may be controlled, for example by manual input signals or by engine speed governor signals or the like, with the blade angle being infinitely variable throughout the range of the blade adjustment to suit the instantaneous flying requirements. For example pitch variation may be effected to increase the pitch of the blading in order to reduce fan speed on approach and so reduce fan noise in the vicinity of airports. The blades of the fan are preferably adjustable to zero pitch to facilitate the starting of fixed shaft engines, which would otherwise require very considerable shaft power with resulting overheating.

Thus according to another aspect of the invention a gas turbine engine of the by-pass type includes a fan having flow-varying blading and rotatable in a by-pass duct, the pitch angle of said blading being variable to provide positive pitch, zero or near zero pitch, negative pitch and a feathered position, in order to control the air flow through the by-pass duct.

Even in the case of free turbine engines overheat problems on starting may be eased by turning the blades to low, near zero, pitch. Furthermore, by putting the blading of the fan into negative pitch aircraft braking may be achieved on short and icy runways, thereby avoiding the necessity for the normal thrust reversers which become too heavy when applied to large fans.

Preferably the servo mechanism is entirely, or at least mainly, mounted within a hub of the fan, and it may be associated with locking means which become effective in the even of enadvertent drift of the fan blades in the fine direction thereby to prevent a further and uncontrolled drift in that direction. The servo mechanism may comprise a hydraulic servo valve mounted in a piston of a hydraulic pitch-change motor of the piston and cylinder type.

Figures 2, 3:
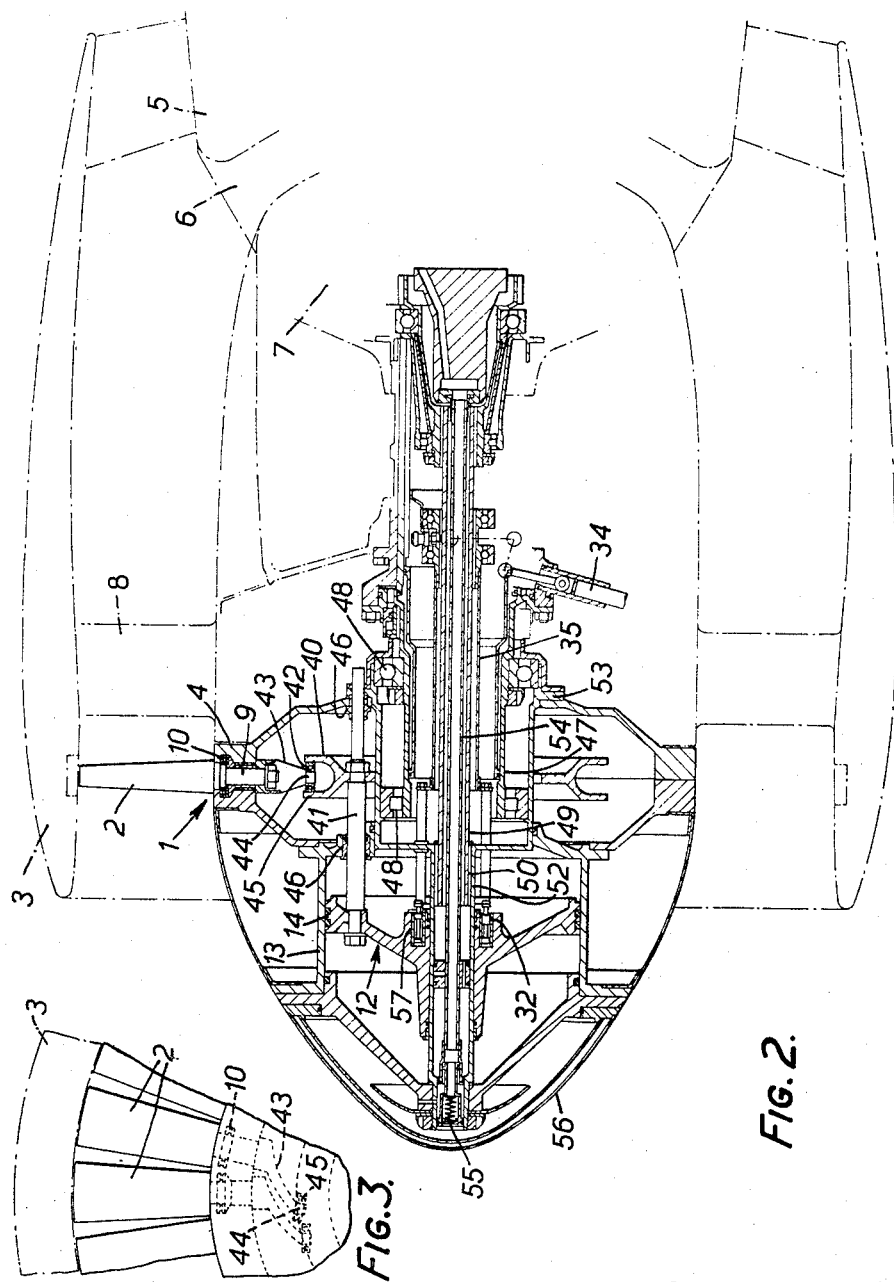
Figure 4:
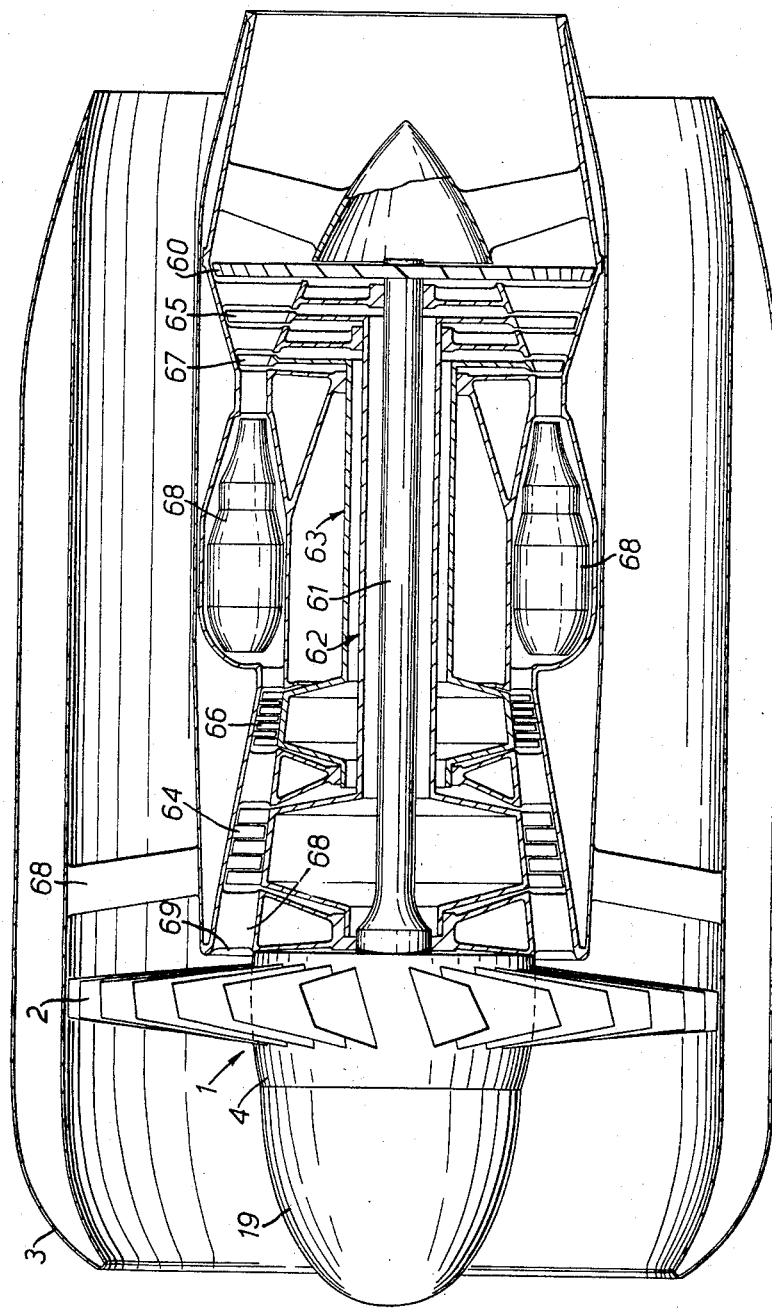
Figure 5:
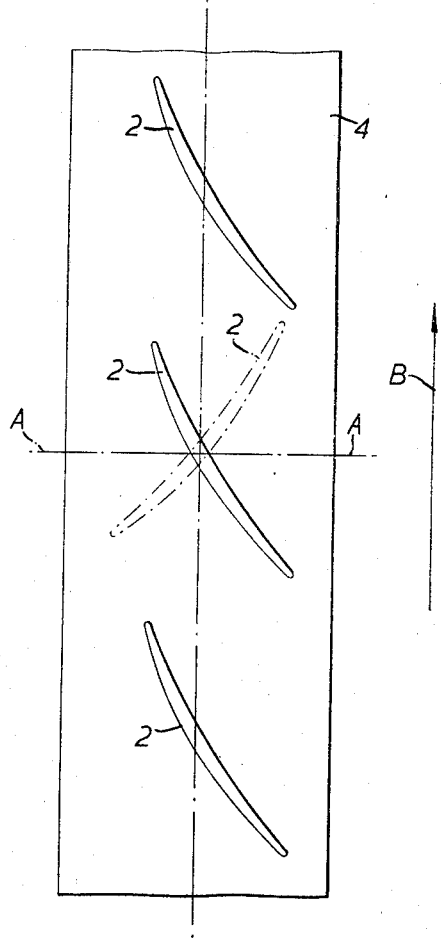

The invention will now be further described with reference to the accompanying drawings which illustrate by way of example, several forms of gas turbine engines in accordance with the invention for use as aircraft power plants. In the drawings:

FIGURES 1 and 2 are axial sectional views of the forward ends of two of the engines, FIGURE 3 is a fragmentary front end view illustrating the arrangement of fan blading in the engine of FIGURE 2, FIGURE 4 illustrates a third engine, partly in axial section and somewhat diagrammatically, and FIGURE 5 is a fragmentary developed view illustrating the profile form of the fan blading of FIGURE 4.

Each of the engines is of the by-pass type and includes a fan, indicated generally by the reference numeral 1, having flow-varying blading 2 and rotatable in a by-pass duct 3. The fan 1 is mounted at the forward end of the engine ahead of the engine compressor with the blading 2 effectively adjustable under the control of a servo mechanism housed within the hub structure 4 of the fan.

In the arrangements of FIGURES 1 to 3 the compressor section, combustion system and turbine section may be of single-shaft form, the outline of only the forward end of the compressor section being illustrated at 5 in these figures. A compressor inlet 6 communicates with the by-pass duct and is thus charged by the fan 1, pitch variation of the blading of which not only varies the by-pass ratio but in effect provides a variable first compressor stage. The fan 1 has a large multiplicity of blades 2, for example seventeen or more, and is driven from the engine compressor/turbine shaft through a reduction gearbox at 7. A ring of stator blades 8 of fixed pitch is mounted within the duct 3 rearwardly of the fan 1 and ahead of the compressor inlet 6.

Referring now to the construction of FIGURE 1, which shows only one of the fan blades 2, each of these blades is mounted at its root 9 in the hub 4 in a needle roller bearing 10, and pitch-change of all the blades in unison is effected by a hydraulic pitch-change motor 12 of the servo mechanism. This motor comprises a forwardly projecting cylinder 13 bolted to the hub 4 and a piston assembly 14 slidable in the cylinder 13 and on a fixed hollow spigot 15 which project centrally through the hub from a rear casing 16 bolted to the rear side of the hub 4. The casing 16 is bolted to a flange 17 of a tubular drive shaft 18 through which the fan 1 is driven from the reduction gearbox 7. The cylinder 13 is enclosed by a spinner 19 of sheet metal construction.

A helical cam mechanism, which converts linear movement of the motor piston assembly 14 to rotary movement of a large bevel gear 20, comprises a rearwardly projecting tubular portion 22 of the piston assembly 14. This portion 22 is formed internally with straight teeth 23 which cooperate with complementary teeth 24 on the outer surface of the spigot 15 to prevent rotation of the piston assembly 14 relatively to the hub 4. On its outer surface the piston portion 22 is provided with helical teeth 25 which engage the tooth spaces between complementary helical teeth 26 formed in a hollow boss 27 of the gear 20.

The bevel gear 20 is rotatably mounted within the hub 4 in anti-friction bearings 28 and has a forwardly dished web with a rearwardly facing toothed rim 29 which meshes with bevel pinions 30 fast on the blade roots 9. Thus, rotation of the gear 20 as a result of axial movement of the piston assembly 14 acts to turn the blades 2 for pitch variation thereof.

Operation of the motor 12 is controlled by a follow-up servo valve, indicated generally by the reference numeral 32, housed within a central tubular portion 33 of the piston assembly 14, this portion 33 being slidable within the spigot 15. The valve 32 is connected to a manual control linkage, only the engine end of which is shown at 34, through a pitch control tube 35 which extends forwardly into the hub 4 coaxially through the drive shaft 18 from the gearbox 7.

The servo valve 32 when displaced by the control linkage 34 admits hydraulic liquid, supplied by an engine-driven pump (not illustrated) through a central supply conduit 36, to the cylinder 13 on one side or other of the piston assembly 14 according to the direction of valve displacement. This produces movement of the piston assembly 14 with corresponding blade pitch adjustment, the piston movement following up the valve movement until the equilibrium condition illustrated in FIGURE 1 again appertains. In that condition the valve 32 effectively seals off the two sides of the cylinder 13 so that the piston assembly 14 is hydraulically locked in the adjusted position, the servo mechanism described not only providing power assistance but also accurate positional control.

The construction of FIGURES 2 and 3 again utilises a hydraulic pitch-change motor 12 with a piston assembly 14 axially slidable in a cylinder 13 bolted to the forward end of the hub 4. A follow-up servo valve 32 mounted in the piston assembly 14 operates in an analogous manner to the valve already described, although of somewhat different construction, valve displacement as before being controlled through an axially movable pitch control tube 35 passing through the hub 4 from the rear side thereof and connecting the valve 32 with a manual control linkage 34.

However, axial movement of the piston assembly 14 is converted to angular pitch adjustment of the blades 2 in a different manner. A unison ring 40 positioned coaxially within the hub 4 is connected to the piston assembly 14 through a ring of rods such as 41 and has a peripheral groove 42. Each blade root 9 has fast thereon a crank arm 43, the offset crank 44 of which carries a ball bearing 45 the outer race of which engages in the groove 42. Thus axial movement of the unison ring 40 with the piston assembly 14, under the control of the servo valve 32, rotates all the crank arms 43 to adjust the pitch of the fan blading. The rods 41 pass through guide bushes 46 which prevent rotation, relatively to the hub 4, of the piston assembly 14 and the unison ring 40.

In this construction the hub 4 is rotatably supported on a forwardly projecting and fixed spigot 47 through anti-friction bearings 48. A tubular drive shaft 49 from the reduction gearbox 7 now passes coaxially through the hub 4 within the spigot 47, forwardly of which it is in splined driving connection at 50 with a forwardly projecting hollow spigot 52 on which the piston assembly 14 again slides and which is formed integrally with a rear casing 53 of the hub 4. As before a central tube 54 which passes through the tubular drive shaft 49 provides a pressure conduit supplied with oil from an engine-driven pump. At its forward end the tube 23 terminates at a pressure relief valve 55. This discharges centrally onto the inner skin of a double-skin nose portion 56 of the spinner. The hot oil is centrifuged and cooled by heat transfer, with the spinner nose portion being heated to prevent ice formation.

In each of the constructions described the servo valve 32 is associated with a lock valve 57 which is connected in series with the control valve 32 and is normally in the open position. The lock valve is connected to the manual control linkage 34 and closes if the piston assembly 14 drifts in the fine pitch direction away from the selected pitch position, due for example to loss of oil pressure or linkage fracture, to form a hydraulic lock with the hydraulic liquid at the forward end of the cylinder 13 sealed therein.

The engine of FIGURE 4, which does not illustrate the internal constructional features of the fan 1, is of the two-spool free turbine type. The fan may be of somewhat larger relative diameter than in the other two constructions—its diameter may be, for example, greater than 6 feet—and it is driven by a free turbine 60 at the rear end of the engine. The turbine 60 drives the fan 1 through a certain shaft 61 which passes through the L.P. and H.P. assemblies 62 and 63, coaxially with these assemblies. The assembly 62 comprises the usual multi-stage L.P. compressor 64 and L.P. turbine 65, and the assembly 63 comprises a multi-stage H.P. compressor 66 and H.P. turbine 67, again in the usual manner. Rings of fixed stator blades 68 are respectively disposed within the duct 3 as before and just within the inlet 69 of the compressor 64.

In all three constructions the fan blading 2 is infinitely adjustable throughout a range including both positive and negative pitch, the latter being employed to reverse the flow along the duct 3 and hence provide aerodynamic braking when required. The range includes zero, or near zero, pitch and a feathered position. In operation of the gas turbine engine, the blade pitch is adjusted in response to the manual control signals to suit the required operating conditions. Thus, the pitch is chosen to suit the intake requirements of the engine compressor and the airflow requirements through the by-pass duct 3. In the event of engine failure it is required that the blades 2 of the fan 1 should be moved rapidly to their feathered position and such feathering may be effected by movement of the servo valve 32 to its coarse pitch selecting position, as a result of which the blades 2 automatically move through coarse pitch to their feathered position.

As can be seen from FIGURE 3 the fan of FIGURES 2 and 3 has a large multiplicity of blades but a solidity ratio of less than unity. This is also the case with the FIGURE 1 construction, and as a result it is possible for the change from positive to negative pitch to occur through the zero pitch position. Thus the leading edge in positive pitch is also the leading edge in reverse pitch.

The fan 1 of the engine of FIGURE 4 has a large multiplicity of relatively wide blades of thin concavo-convex section providing a solidity ratio greater than unity, so that it is not possible to reach zero pitch and the blades are accordingly capable of being turned to reverse pitch through the feathered position, in which position the blade profile is generally aligned with the axis A—A in FIGURE 5. In that figure three blades 2 are shown in profile in a positive pitch position as in normal flight, with one of them also shown in broken lines in a reverse pitch position. The direction of rotation is indicated in FIGURE 5 by the arrow B and it will be seen that what are the trailing edges of the blades 2 in forward pitch become the leading edges in the reverse position. Due to the thin concavo-convex section of the blades referred to above the changed geometry in reverse pitch is acceptable in practice. Moreover it will be understood that as the fan 1 is driven by a free turbine the change in geometry will not stall the gas producer stages of the engine.

We claim:

1. A gas turbine engine of the by-pass type having a by-pass duct, a single-stage fan having flow-varying blading and rotatable in said by-pass duct, a shaft which extends axially from a turbine section of the engine and by which the fan is driven, said turbine section having a rotor fixed on said shaft to drive the latter, and a servomechanism for varying the position of said blading, said fan being mounted ahead of a compressor section of the engine so that it is operative to charge both the compressor and the by-pass duct.

2. A gas turbine engine according to claim 1, wherein the fan blading is of variable pitch.

3. A gas turbine engine according to claim 1, wherein a ring of stator blading is disposed within the by-pass duct between the fan and the compressor inlet.

4. A gas turbine engine according to claim 3, wherein the stator blading is of fixed pitch.

5. A gas turbine engine according to claim 1, wherein the fan blading is adjustable to bring the blades effectively to a feathered position.

6. A gas turbine engine according to claim 1 wherein the fan blading is effectively reversible for reversing the direction of air flow along the duct.

7. A gas turbine engine according to claim 1, wherein the engine is of single-shaft type and the fan is driven by said shaft through a reduction gearbox.

8. A gas turbine engine having a by-pass duct, a single-stage fan having flow-varying blading and rotatable in said by-pass duct, and means for varying the pitch angle of said blading to provide positive pitch, zero or near-zero pitch, negative pitch and a feathered position, in order to control the air flow through the by-pass duct.

9. A gas turbine engine according to claim 8, wherein the turning of the fan blades to reverse pitch is effected through the feathered position, so that the trailing edges of the blades in forward pitch become the leading edges in the reverse pitch position.

10. A gas turbine engine having a by-pass duct, a single-stage fan having a hub and flow-varying blading, said fan being rotatable in said by-pass duct, and a servo mechanism mounted within said hub for varying the position of said blading.

11. A gas turbine engine having a by-pass duct, a single-stage fan having flow-varying blading and rotatable in said by-pass duct, a pitch-change motor of the piston and cylinder type for effecting pitch variation of said blading, and a servo mechanism which is hydraulic in operation for controlling the motor, said mechanism comprising a servo valve which is displaceable for pitch adjustment and mounted in the piston of said motor so that the piston follows-up control movement of the valve.

12. A gas turbine engine of plural spool type and having a by-pass duct, a single-stage fan which is rotatable in said by-pass duct and mounted ahead of an L.P. compressor of the engine, a free turbine arranged aft of an L.P. turbine stage of the engine, and a shaft which passes through the L.P. and H.P. assemblies of the engine and through which the free turbine drives the fan.

13. A gas turbine engine of the by-pass type having a compressor and a by-pass duct, a single-stage fan having blading of variable pitch and rotatable in said by-pass duct, the fan being mounted ahead of said compressor thereby to charge both the compressor and the by-pass duct, the blading pitch being variable to provide a range of obtainable pitch positions, and a servomechanism for varying the pitch position of said blading.

References Cited

UNITED STATES PATENTS 3,009,318  11/1961  Skoff _____ 60—264

FOREIGN PATENTS 502,514  5/1954  Canada.
866,145  2/1953  Germany.
244,980  6/1947  Switzerland.
457,026  5/1950  Italy.

ROBERT M. WALKER, Primary Examiner

U.S. Cl. X.R.

60—262; 170—160.32